Jan. 6, 1925.

W. T. HOOFNAGLE

Re. 15,974

PROTECTIVE DEVICE FOR ELECTRIC FLATIRONS

Original Filed Feb. 10, 1921

Inventor,
William T. Hoofnagle.

By Robert Watson
Attorney

Reissued Jan. 6, 1925. Re. 15,974

UNITED STATES PATENT OFFICE.

WILLIAM T. HOOFNAGLE, OF GLEN RIDGE, NEW JERSEY.

PROTECTIVE DEVICE FOR ELECTRIC FLATIRONS.

Original No. 1,447,134, dated February 27, 1923, Serial No. 443,890, filed February 10, 1921. Application for reissue filed September 30, 1924. Serial No. 740,814.

*To all whom it may concern:*

Be it known that I, WILLIAM T. HOOFNAGLE, a citizen of the United States, residing at Glen Ridge, in the county of Essex and State of New Jersey, have invented certain new and useful Improvements in Protective Devices for Electric Flatirons, of which the following is a specification.

As electric flat irons are now made, the resistance or heating element of the iron is so proportioned that while the iron is in use, the heat absorbed by the fabric on which it is operating prevents excessive heating of the iron; but if the iron is allowed to stand idle, with the current on, it accumulates heat very rapidly, particularly if it rests upon an object which is a poor conductor of heat. In order to avoid fire and damage by over-heated irons, it is customary to rest the iron on a metal support, and to cut off current from the iron when not in use; but a careless operator will sometimes rest the iron upon a combustible support, such as an ironing board or table, and fail to cut off the current, with the result that the iron becomes overheated and sets fire to the support.

The purpose of this invention is to provide means for automatically cutting off the current from the electric iron when the iron becomes over-heated, thereby preventing the possibility of setting fire to objects upon which it may be left standing. In carrying out the invention, I provide a fuse socket on or in the body of the iron, and arrange within this socket an ordinary fuse plug, having a fuse of the proper current carrying capacity to protect the internal circuit of the iron against excessive currents which may result from short circuits, and also so related to the body of the iron that the fuse will be heated by the sole-plate of the iron and will melt when the latter becomes excessively hot.

Figure 1:
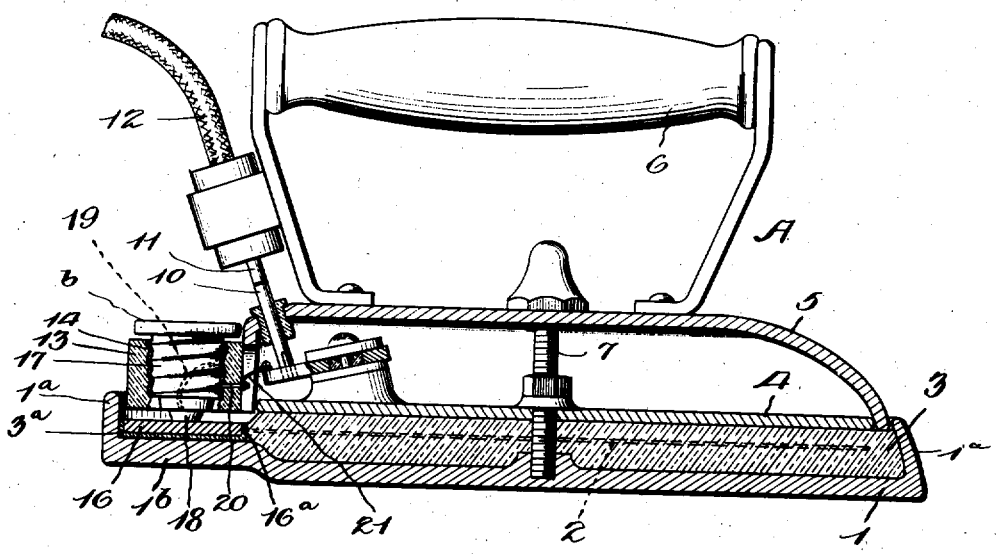
Figure 2:
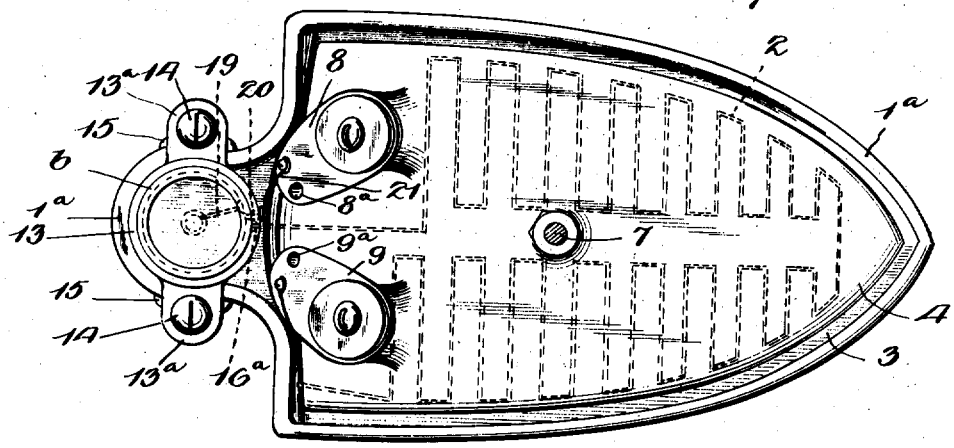

In the accompanying drawing,

Fig. 1 is a longitudinal, central section through an electrically heated flat iron having a fuse plug attachment; and, Fig. 2 is a top plan view of the same, with the handle, attaching cord and cover plate removed, the heating element being shown in dotted lines.

Referring to the drawing, A indicates the iron comprising a metal base or sole-plate 1, having an upturned flange $1^a$, a resistance 2, embedded in insulating material 3 which rests upon the base, a metal plate 4, resting upon the insulating material, and a top plate 5, provided with a handle 6, the members 1, 4, and 5 being secured together by a screw 7. The plate 4 carries insulated metal connectors 8 and 9, having openings $8^a$ and $9^a$, adapted to receive the terminals 10 and 11 of an electric cord 12, through which current is supplied to the resistance or heating element.

The sole-plate of the iron is of the usual form, except that I provide a rearward extension $1^b$, which is raised above the body of the plate, as shown, and supports a socket 13, of insulating material. This socket has oppositely projecting arms $13^a$, which are secured by screws 14 to ears 15, which project from the flange $1^a$. The socket has an internal metal shell 14, screw-threaded to receive an ordinary fuse plug *b*. The socket shown in the drawing is open at its lower end, in order that the plug may engage a metal body 16 which is arranged below the socket within a thin cup-shaped piece of insulating material $3^a$, which electrically insulates the body from the sole-plate of the iron but allows it to come close to the plate so as to be heated thereby. The fuse plug has the usual externally threaded metal shell 17, adapted to make contact electrically with the shell in the socket, and a base contact piece 18, adapted to rest against the metal body 16 when the plug is in the socket. The fuse 19, indicated in dotted lines, is arranged within the plug and connected to its shell and to its end contact, as usual. One end of the resistance 2 is connected to the connector 9, as shown in Fig. 2, and the other end of the resistance is connected to the plate 16, as shown at $16^a$. The metal shell 14 in the socket is connected to the connector 8 by a pin 20, extending through the wall of the socket, and a wire 21 connected between said pin and said connector.

It is to be noted that the plug is placed in a position where its base contact 18, which is connected to the fuse and conducts the heat thereto, will be directly heated by the sole-plate and will not be directly heated by the resistance 2, which heats the sole-plate. This is important, because it is the sole-plate temperature which should control the melting of the fuse. The resistance is always at a red heat while the current is turned on, while the sole-plate will be cold at the start, at a safe working temperature while the iron is in use, and will reach the scorching temperature if left standing with the current turned on. By arranging the parts so that the base-piece of the plug, which is connected to the fuse, can be heated by the sole-plate and not directly affected by the heat of the resistor, the fuse will always blow when the sole-plate reaches a predetermined temperature.

When the cord is connected to the iron and the current is turned on, the current flows in a circuit extending from the connector 9 through the resistance 2 to the plate 16, thence through the contact 18 at the base of the fuse plug and through the fuse to the shell of the plug, thence to the shell of the socket, and thence through connections 20 and 21 to the connector 8. When the iron is in use, it does not become excessively hot because this heat is dissipated in the fabrics on which it is operating. If the iron is allowed to stand, in one spot, with the current on, the iron becomes excessively hot, particularly if the support upon which it is placed is a poor conductor of heat, such as wood or cloth. This accumulation of heat in the sole-plate causes the plate 16 also to become very hot, and as the contact piece 18 of the fuse plug rests upon this plate, the latter also, and the fuse connected to it, will become excessively hot and the fuse will melt and interrupt the electric circuit when the temperature of the fuse reaches the melting point. Thus, the current will be cut off and the iron will cool. In order to use the iron again, it will be necessary to place a new fuse plug in the socket. If, while the current is applied to the iron, a short circuit occurs in its internal circuit which includes the fuse, the latter will blow and cut off the current.

What I claim is:

1. In an electrically heated flat iron, a sole-plate, a resistance for heating the same, a socket on the iron, a fuse plug fitting said socket and having a metal part adapted to conduct heat from the sole-plate to the fuse, and a circuit extending through the resistance and plug.

2. In an electrically heated flat iron, a sole-plate, a resistance for heating the same, a socket on the iron, a fuse plug fitting said socket and having a metal part adapted to engage a surface on the sole-plate and to conduct heat from the sole-plate to the fuse, and a circuit extending through the resistance and plug.

3. In an electrically heated flat iron, a sole-plate, a resistance for heating the same, a socket on the iron, a fuse plug fitting said socket and having a metal part adapted to engage a surface on the sole-plate at a point removed from the resistance and to conduct heat from the sole-plate to the fuse.

4. In an electric flat iron, a heating resistance and a metal body, in series with the resistance, adapted to be heated by the iron, a socket of insulating material mounted on the iron and having an internal threaded contact shell, and a hollow fuse plug having a threaded side contact engaging said shell, a base contact engaging said body, and a fuse within the plug connected to said side and base contacts.

5. In an electric flat iron, a heating resistance and a metal body, in series with the resistance, adapted to be heated by the iron, a socket of insulating material mounted on the iron and having an internal threaded contact shell, said socket having its lower end open, and a hollow fuse plug extending through the socket to said body, said plug having a threaded side contact engaging said shell, a base contact engaging said body, and a fuse within the plug connected to said side and base contacts.

In testimony whereof I affix my signature.

WILLIAM T. HOOFNAGLE.